3,810,762
PHOTOCHROMIC COMPOSITION CONTAINING POLYHALOGENATED HYDROCARBON, SPIROPYRAN COMPOUND AND POLY-N-VINYLCARBAZOLE AND THE USE THEREOF
Urbain Leopold Laridon, Wilrijk, and Josef Willy van den Houte, Grimbergen, Belgium, assignors to Agfa-Gevaert N.V., Mortsel, Belgium
No Drawing. Filed Sept. 1, 1971, Ser. No. 177,119
Claims priority, application Great Britain, Sept. 1, 1970, 41,749/70
Int. Cl. G03c 1/52, 5/24
U.S. Cl. 96—48 R
24 Claims

ABSTRACT OF THE DISCLOSURE

A photographic process wherein a visible image is formed by print-out or optical development in a recording material comprising in intimate admixture a spiropyran compound, an ultraviolet light-sensitive compound capable of producing on exposure with ultraviolet light with the spiropyran a dye salt and as sensitizing agent a polymeric compound containing recurring units of the following general structure:

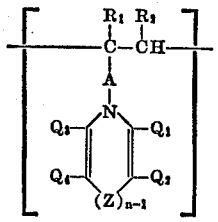

wherein:

Z represents a sulphur atom or a single bond,
A represents a single bond or a —$CH_2$— group,
$R_1$ represents hydrogen or a lower alkyl radical,
$R_2$ represents hydrogen or a lower alkyl radical,
$Q_1$ and $Q_2$ each represent a hydrogen atom or together the necessary atoms to close an adjacent carbocyclic ring or ring system including such ring or ring system in substituted form,
$Q_3$ and $Q_4$ each represent a hydrogen atom or together the necessary atoms to close an adjacent carbocyclic nucleus or ring system including such a ring or ring system in substituted form,
n represents 1 or 2.

Preferred recording materials contain a spirodinaphthopyran compound, carbon tetrabromide and/or iodoform and as sensitizing agent poly-N-vinylcarbazole acting as a binder and a triaryl stibine as antifogging agent.

---

This invention relates to photographic recording and reproduction of information and to materials suited therefor.

The use of particular spiropyrans in the manufacture of photographic recording materials is known, e.g. from the United States patent specification 2,953,454 of E. Berman-Nat. Cash Reg., issued Sept. 20, 1960. The spiropyrans described therein are characterized as being reversibly transformable into a colored form by activating electromagnetic energy.

In many applications such reversible transformation is not deirable and therefore efforts have been made to obtain a print-out color image the color of which does not fade by keeping it in the dark or by a further irradiation with electromagnetic radiation differing in wavelength from the radiation originally applied.

In the German patent specification 1,274,655 a recording material has been described by means of which stable print-out dyestuff images can be obtained by using spiropyrans in admixture with a compound that activated with electromagnetic radiation can yield photolytically formed free radicals.

The starting substances for these radicals are preferably halogenated organic compounds.

The recording materials described in the latter patent specification need rather long exposure times with the conventional ultraviolet light sources.

It is an object of the present invention to provide a method for increasing the photosensitivity of recording materials which contain a photosensitive compound that by information-wise exposure to activating electromagnetic radiation yields a dyestuff image by reaction with a spiropyran compound.

It is another object of the present invention to provide a method for making visible or intensifying a latent image or barely visible image produced with said spiropyran and photosensitive compound. Said method is called hereinafter "optical development" for it operates with an overall exposure in the wavelenth range of electromagnetic radiation absorbed by dyestuff traces formed in the image-wise exposure.

It is a further object of the present invention to provide photographic materials suited for use in said methods.

It has now been found that the photosensitivity for forming a directly visible image or optical development sensitivity of a recording material containing in intimate admixture:

(1) at least one spiropyran compound, and
(2) at least one ultraviolet light-sensitive compound capable of producing on exposure with ultraviolet light with said spiropyran compound a dyestuff salt is increased by applying in working relationship with said mixture a polymeric compound containing recurring units of the following general structure:

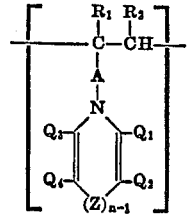

wherein:

Z represents a sulphur atom or a single bond,
A represents a single bond or a divalent hydrocarbon group, e.g. a —$CH_2$— group,
$R_1$ represents hydrogen or a lower alkyl radical, e.g. a methyl radical,
$R_2$ represents hydrogen or a lower alkyl radical, e.g. a methyl or an ethyl radical,
$Q_1$ and $Q_2$ each represent a hydrogen atom or together the necessary atoms to close an adjacent carbocyclic ring or ring system including such ring or ring system in substituted form, preferably an aromatic ring (e.g. a benzene ring) including a substituted aromatic ring, e.g. a halogen substituted (chlorine, bromine or iodine substituted) benzene ring,
$Q_4$ and $Q_3$ each represent a hydrogen atom or together the necessary atoms to close an adjacent carbocyclic nucleus or ring system including such a ring or ring system in substituted form, preferably an aromatic ring (e.g. a benzene ring) including a substituted aromatic ring, e.g. a halogen substituted (chlorine, bromine or iodine substituted) benzene ring, and
n represents 1 or 2.

The N-vinyl polymers and copolymers can be prepared by application of one of the various known polymerization procedures, e.g., by pearl- or emulsion polymerization or by polymerization in solution, whereby the initiation of the polymerization can occur by free radicals, by ion formation, or by radiation, e.g., with actinic light. It is to be noted that the polymerization degree is not critical and can vary between wide limits. As far as the copolymers are concerned, it is further to be noted that the content of groups corresponding to the general formula given hereinbefore is not critical and, as shown further on in the table of copolymers containing N-vinylcarbazole units, can vary between wide limits, say, e.g. between 20 and 95%, taking into account the properties of the compounds used in the preparation of the copolymers and the required sensitizing and/or mechanical properties. In general, the best results are attained with copolymers having a content of vinylcarbazole units between 40 and 90%.

The preparation of suitable poly-N-vinylcarbazoles is described, e.g. in the German patent specifications 931-731 filed Mar. 4, 1953, 936,421 filed Feb. 20, 1953, 1,097,680 filed Oct. 15, 1959 all three by B.A.S.F., and 1,158,367 filed July 18, 1962 by Gevaert Photo-Producten N.V., and the U.S. Pat. 2,072,465 of W. Reppe, E. Keyssner and E. Dorrer, issued Mar. 2, 1937. The preparation of poly-N-vinyl-pyrrole proceeds analogously.

The preparation of suitable N-vinylcarbazole copolymers is described in the United Kingdom patent specification 964,875 filed Apr. 21, 1960 by Gevaert Photo-Producten N.V. which specification also contains a preparation receipt for poly(N-allyl carbazole) ($R_1=CH_3$ and $R_2=H$) and for poly(N-propenyl carbazole)($R_1=H$, $R_2=H$, $A=-CH_2-$).

The poly-N-vinyl indoles are described in the published German patent application 1,906,831 filed Feb. 12, 1969 and 1,917,747 filed Apr. 5, 1969 by I.B.M. Corp. The poly-N-vinyl diphenylamine is described in the published German patent application 2,007,692 filed Mar. 3, 1969 by Xerox Corp. Halogen-substituted poly-N-vinyl carbazoles are described in the published Japanese patent applications 21,875/67 filed June 18, 1964, 25,230/67 filed Oct. 13, 1964, 7,592/68 filed Nov. 27, 1964, 19,751/67 filed June 18, 1964 and 7,591/68 filed Nov. 18, 1964 all by Matsushita Electric Industrial Co. Ltd.

For illustrative purposes suitable vinyl copolymers containing N-vinyl carbazole units are enumerated in the following Table 1.

TABLE 1

| Copolymer | Mole percent of N-vinyl carbazole |
|---|---|
| -copolymer of N-vinylcarbazole and vinylidene chloride | 85.4 |
| -copolymer of N-vinylcarbazole and 3,3',5-trimethyl isononylether | 93 |
| -copolymer of N-vinylcarbazole and vinyl acetate | 88.6 |
| -copolymer of N-vinylcarbazole and isopropenyl acetate | 94.5 |
| -copolymer of N-vinylcarbazole and vinylstearate | 37.5 |
| -copolymer of N-vinylcarbazole and methylacrylate | 67.6 |
| -copolymer of N-vinylcarbazole and ethylacrylate | 41 |
| -graft copolymer of N-vinylcarbazole and ethylacrylate | 90.3 |
| -emulsion polymer of N-vinylcarbazole and polyethylacrylate | 94.5 |
| -copolymer of N-vinylcarbazole and n-butylacrylate | 58.3 |
| -copolymer of N-vinylcarbazole and 2-ethylhexylacrylate | 51.6 |
| -copolymer of N-vinylcarbazole and acryloxyethyldiethylamine | 76.6 |
| -copolymer of N-vinylcarbazole and vinylcinnamate | 92.5 |
| -copolymer of N-vinylcarbazole and methylmethacrylate | 62.7 |
| -copolymer of N-vinylcarbazole and isobutylmethacrylate | 51.8 |
| -copolymer of N-vinylcarbazole and laurylmethacrylate | 77.4 |
| -copolymer of N-vinylcarbazole and methacryloxyethyl diethylamine | 9.7 |
| -copolymer of N-vinylcarbazole and acrylonitrile | 88 |
| -graft copolymer of N-vinylcarbazole and butylaldehyde acetal of polyvinylalcohol | 30 |
| -copolymer of N-vinylcarbazole and di(2-dichloroethyl)-vinylphosphonate | 82.4 |
| -copolymer of N-vinylcarbazole and styrene | 49 |
| -graft copolymer of N-vinylcarbazole and polystyrene | 27.3 |
| -copolymer of N-vinylcarbazole and vinylnaphthalene | 47.1 |
| -copolymer of N-vinylcarbazole and anthracene-(9,10) | 91.5 |
| -copolymer of N-vinylcarbazole and 2-vinylpyridine | 31.8 |
| -copolymer of N-vinylcarbazole and 4-vinylpyridine | 32.4 |
| -copolymer of N-vinylcarbazole and N-vinylpyrrolidine | 69.1 |
| -terpolymer of N-vinylcarbazole, acrylonitrile and styrene | 20 |
| -graft copolymer of a terpolymer of vinyl chloride, vinyl acetate and vinyl alcohol with N-vinylcarbazole | 29.4 |
| -graft copolymer of a terpolymer of vinyl chloride, vinyl acetate and maleic anhydride with N-vinylcarbazole | 55.1 |

Spiropyran compounds suited for photographic image formation according to the present invention are spiropyrans containing at least one pyran ring having in the ortho- and meta-position to the oxygen atom a condensed benzo, naphtho or other higher aromatic polycyclic condensed ring system including these condensed rings or ring systems in substituted state, e.g. an anthraceno or a phenanthreno ring system, e.g. as present in a spirodibenzopyran, a spirodinaphthopyran, a spirobenzonaphthopyran, a 1,3,3-trimethylindolinobenzospiropyran, a 1,3,3-trimethylindolinonaphthospiropyran or such spiropyrans containing condensed aromatic nuclei of the anthracene or phenanthrene type.

In said spiropyrans the pyran rings, the condensed benzo, the condensed higher aromatic rings as well as the 1,3,3-trimethylindolino ring may be substituted.

Suitable substituents therefore are, e.g. hydrocarbon groups such as alkyl groups, e.g. lower alkyl groups such as methyl, substituted alkyl groups, e.g. halogen, or phenyl substituted alkyl groups, alkylene ester groups, e.g. a $-CH_2-COOC_2H_5$ group, alkylene carboxyl groups, e.g. a $-CH_2-COOH$ group, carbonamide groups or substituted carbonamide groups, e.g. a

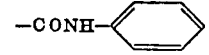

group, halogen, nitro, hydroxy, alkoxy, aryloxy or a substituent linking the carbon atoms in 3,3'-position in the spiropyran system together, e.g. a $(CH_2)_n$-chain wherein $n$ is 2 or 3.

General formulae covering particularly suited spiropyrans are the following:

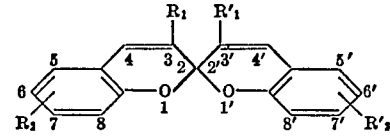

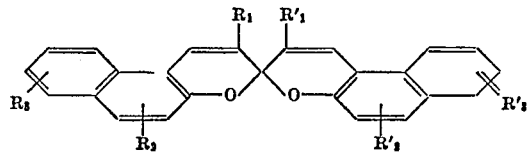

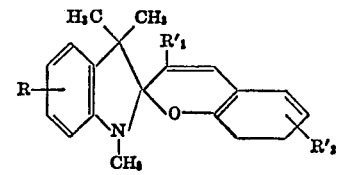

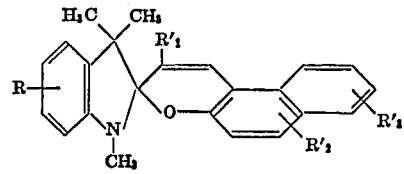

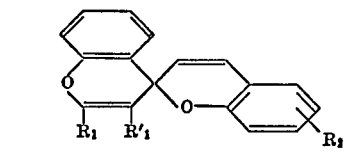

wherein: R, $R_1$, $R'_1$, $R_2$, $R'_2$, $R_3$ and $R'_3$ represent hydrogen, an aliphatic group including a substituted aliphatic group, e.g. a $(C_1-C_{20})$alkyl group including such an alkyl group in substituted form, more particularly a methyl, ethyl, propyl, amyl or hexadecyl group or halogen substituted alkyl group, halogen, nitro, hydroxy, an alkoxy or aryloxy group, a phenyl group or a substituted phenyl group, piperidyl, an alkylene ester group, e.g. a

—CH$_2$—COOC$_2$H$_5$ group, an alkylene carboxyl group, e.g. a —CH$_2$—COOH group, a carbonamide group or a substituted carbonamide group, e.g. a

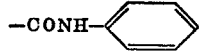

group, or R$_1$ and R$'_1$ together represent a —(CH$_2$)$_n$— chain wherein $n=2$, or 3 to link the carbon atoms in the 3 and 3' positions together.

Suited spiropyran compounds and their preparation are described in the published German patent applications 1,274,655 filed Dec. 15, 1965 by Telefunken Patentverwertungs G.m.b.H., 1,269,665, 1,286,110, 1,286,111 and 1,286,112 all filed Sept. 30, 1966 by Telefunken Patentverwertungs G.m.b.H., and by W. Dilthey, Berres, Hölterkoff, Wübken, J. Pr. Ch. [2] 114, 187 (1926), by C. F. Koelsch and W. R. Workman in J.A.C.S. 74 6288 (1952) and in J. Chem. Soc. (1934), 1571 by I. M. Heilbron and G. F. Howard.

Preferred spiropyran compounds are spirodinaphthopyrans and spirobenzonaphthopyrans including such compounds wherein the naphtho- and/or benzo ring(s) is (are) substituted.

An illustrative list of particularly useful spiropyran compounds is given in the following Table 2.

TABLE 2

| | Spiropyran compound | Melting point (° C.) |
|---|---|---|
| 1 | ![structure] | 257 |
| 2 | CH$_3$ | 204 |
| 3 | H$_3$C—CH—CH$_3$ | 208 |
| 4 | C$_5$H$_{11}$ | 185 |
| 5 | CH$_3$—COOH | 164 |
| 6 | CH$_3$—COOC$_2$H$_5$ | 166 |
| 7 | CH$_3$—CO—NH—C$_6$H$_5$ | 210 |
| 8 | CH$_3$, H$_3$C CH$_3$ | 238 |
| 9 | piperidyl | 140 |

TABLE 2—Continued

| | Spiropyran compound | Melting point (° C.) |
|---|---|---|
| 10 | (structure with Cl substituent) | 180 |
| 11 | (structure with COCH₃ substituent) | 260 |
| 12 | (structure with OH substituents) | >260 |
| 13 | (structure with OCH₃ substituents) | >260 |
| 14 | (structure with O₂N, NO₂ substituents) | >260 |
| 15 | (structure) | 168 |
| 16 | (structure with CH₃) | 110 |
| 17 | (structure with CH₃ and Br substituents) | 163 |
| 18 | (structure with CH₃ and OCH₃ substituents) | 110 |
| 19 | (structure with CH₃ and phenyl substituents) | 185 |
| 20 | (structure with H₃C, CH₃ substituents and N-CH₃ groups) | 206 |
| 21 | (structure with H₃C, CH₃ and N-CH₃) | 180 |

TABLE 2—Continued

| | Spiropyran compound | Melting point (°C.) |
|---|---|---|
| 22 | (structure) | 88 |
| 23 | (structure) | >260 |
| 24 | (structure) | 173 |
| 25 | (structure) | 193 |
| 26 | (structure) | 158 |
| 27 | (structure) | 144 |
| 28 | (structure) | 180 |
| 29 | (structure) | 160 |

TABLE 2—Continued

| | Spiropyran compound | Melting point (°C.) |
|---|---|---|
| 30 | | 112 |
| 31 | | 120 |
| 32 | | ±200 |
| 33 | | 248 |
| 34 | | 152 |
| 35 | | 160 |

TABLE 2—Continued

| Spiropyran compound | Melting point (° C.) |
|---|---|
| 36 | ±250 |
| 37 | |
| 38 | 133 |
| 39 | 146 |

In order to illustrate in more detail the preparation of the diaryl spiro-pyran compounds and the indolino-arylo-spiropyran compounds the following preparation recipes are given:

PREPARATION 1

Preparation of 3-methyldi-β-naphthospiropyran (compound 2 of Table 2)

In a 2 liter three-necked flask, fitted with a reflux condenser and a gas inlet tube reaching nearly the bottom of the flask are introduced:

| | |
|---|---|
| Ethanol | 1 liter |
| Butanone | 22 ml. (0.25 mole) |
| 2-hydroxy-1-naphthaldehyde | 86 g. (0.5 mole) |

The flask is shaken until partial dissolution of the ingredients. Dry hydrogen chloride gas is introduced at a rate which allows complete absorption and the start of ethanol reflux. Thereupon the already strongly blue colored mixture is cooled down in a mixture of ice and sodium chloride and the introduction of hydrogen chloride gas continued until saturation. In the reaction mixture green crystals of pyrylium salt are formed and the crystallization allowed to proceed overnight in a refrigerator.

The formed pyrylium salt is separated by suction, is washed with ethanol and thereupon brought into suspension in 300 ml. of ethanol.

Whilst stirring a 10% by weight aqueous solution of ammonium hydroxide is added until the mixture is definitely alkaline. During that operation the mixture becomes colorless.

The obtained crystalline product is separated by suction, washed with water and dried.

Finally the spiropyran compound is recrystallized from 600 ml. of benzene and again separated and dried under reduced pressure at 50–60° C. Yield: 45 g. Melting point: 204° C.

PREPARATION 2

Preparation of 1,3,3-trimethylindolinobenzopyrylospiran (compound 22 of Table 2)

In a 100 ml. flask fitted with a reflux condenser are introduced the following ingredients:

Salicylaldehyde _____ 3.7 g. (0.03 mole)
1,3,3-trimethyl-2-methylene indolamine _____ 5.1 g. (0.03 mole)
Ethanol _____ 90 ml.

The solution is boiled under reflux for a period of 2 hours. Thereupon the mixture is cooled down and filtered.

To the filtrate water is added for separation of a solid product. The solid is separated by suction, washed with water and dried under vacuum conditions.

The spiran compound is recrystallized from 15 ml. of hexane.

Yield: 5 g. Melting point: 93–94° C.

The compound capable of producing a dye salt with a spiropyran on exposure to activating electromagnetic radiation is for use according to the present invention preferably an organic polyhyalogen compound of which a halogen containing radical can be photolytically separated. Compounds possessing that property are within the scope of the following general formula:

wherein: each of A, B, X and Y are halogen atoms of the group of chlorine, bromine or iodine, or wherein one of said radicals A, B, X or Y represents an alkyl group, including a substituted alkyl group, e.g. a halogen substituted alkyl radical, a hydroxyalkyl radical, or an aralkyl radical, e.g. a benzyl radical, an aryl group, a substituted ryl group or an aroyl group and the other radicals chlorine, bromine or iodine, or wherein at least two of said radicals A, B, X or Y represent an aromatic acyl group, i.e., a benzoyl group and the other radicals chlorine, bromine or iodine.

Suitable representatives falling within the scope of that general formula are organic halides such as carbon tetrabromide, bromoform, iodoform, hexachloroethane, hexahexabromoethane, pentabromoethane, 1,1,2,2-tetrabromoethane, α,α,α-tribromoacetophenone and tribromoethanol.

The amount of polymeric sensitizing agent is not critical. The polymeric sensitizing agent when having a film forming chaarcter may be used in an amount large enough to take profit of its binding character so that there is no need for an auxiliary inactive binding agent for the photoactive ingredients.

A rather small amount of polymeric sensitizing agent with respect to the spiropyran compound may be used in the presence of an auxiliary binder, e.g. 0.005 g. to 0.10 g. of polymeric sensitizing agent to 0.005 g. to 0.2 g. of spiropyran compound.

The spiropyran compound(s) are further preferably used in admixture with a 5- to 20-fold amount by weight of photosensitive organic halogen compound such as carbon tetrabromide. This ratio is, however, not limitative since useful results can be obtained with, e.g. the spiropyran and photosensitive polyhalogen compound in a ratio by weight in the range of 1:1 to 1:50.

The polymeric N-vinyl sensitizing agent used according to the present invention may be applied as the sole sensitizing agent or in combination with one or more sensitizing compounds belonging to one of the following classes:
(A) organic compounds containing two radicals of different electron-affinity (the term radical includes group as well as atom) linked to each other through a conjugated system, Useful sensitizing agents of Class A are those having one of the following general Formulae (I), (II), (III), (IV), (V) or (VI):

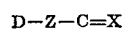 (I)

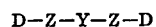 (II)

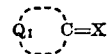 (III)

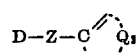 (IV)

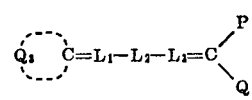 (V)

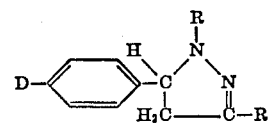 (VI)

wherein:
D represents an electron-donating group, e.g. an akyl (preferably $C_1$–$C_5$ alkyl), cycloalkyl or aralkyl substituted amino or hydroxy group, preferably a monoalkyl amino group, a dialkylamino group or an alkoxy group, Z represents a conjugated system, e.g. a polymethine chain or an azamethine chain including such chain that is substituted or makes part of a ring structure e.g. a phenylene or a naphthylene ring, R represents hydrogen, a hydrocarbon radical, e.g. an alkyl, an aryl or a heterocyclic group preferably a methyl group or a phenyl group, or the necessary atoms to form a homocyclic or heterocyclic ring with an atom of the group Z, $Q_1$ represents the nonmetallic atoms necessary to complete a ring or ring system in which the group C=X through a conjugated system is linked to an electron-donating group as described for D, X represents an electronegative atom or group, e.g. oxygen, =N—R wherein R is hydrogen or an aromatic group, sulphur, selenium,

and other bivalent electron-attracting groups known in organic chemistry, preferably however X represents oxygen or sulphur, $Q_2$ represents the nonmetallic atoms necessary to complete a ring or ring system wherein the group

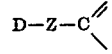

is linked through a conjugated system to an electron-attracting group, e.g. a carbonyl group, a thiocarbonyl group, a sulfonyl group or a dicyanomethylene group, or represents the necessary atoms to form with the carbon atom of the group

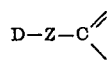

a heterocyclic ring having an electronegative character with respect to the group D, e.g. a benzoxazole ring, Y represents an electron-attracting group, e.g.

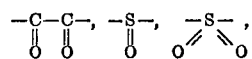

or the group

wherein X has the same meaning as described above, $Q_3$ represents a heterocyclic nucleus, containing an electron-donating group, e.g. a dialkylamino group that is linked through a conjugated system with the group $$=C\begin{matrix}P\\Q\end{matrix},$$

wherein P and Q each represent an electron-attracting substituent, e.g. a cyano group or wherein P and Q together represent the necessary atoms to close a heterocyclic ring with electronegative character, e.g. as present in merocyanine dyes such as a ketomethylene ring of which a rhodanine nucleus is a particular example, each of $L_1$ and $L_3$ represent a methine group or a substituted methine group, and $L_2$ represents a monovalent chemical bond, an $\alpha,\beta$-ethylenically unsaturated bivalent group, e.g. a $$-\underset{H}{C}=\underset{H}{C}-$$

group or a plurality of said groups linked to each other, or $L_1$, $L_2$ and $L_3$ represent together a double bond linking the group to the group $$C\begin{matrix}P\\Q;\end{matrix}$$

Preferred compounds falling within the scope of Formula I are:

1. H₃C–N(–)–C₆H₄–CHO with H₃C

2. H₃C–N(–)–C₆H₄–COCH₃ with H₃C

Preferred compounds falling within the scope of Formula II are:

3. (H₃C)₂N–C₆H₄–CO–C₆H₄–N(CH₃)₂

4. (H₃C)₂N–C₆H₄–CS–C₆H₄–N(CH₃)₂

5. (H₃C)₂N–C₆H₄–CO–C₆H₄–N(CH₃)(NO)

6. (H₃C)₂N–C₆H₄–CH=CH–CO–C₆H₄–N(CH₃)₂

7. (H₃C)₂N–C₆H₄–CO–CO–C₆H₄–N(CH₃)₂

Preferred compounds falling within the scope of Formula III are described, e.g. in the Belgian patent specification 747,849 filed Mar. 23, 1970 by Gevaert-Agfa N.V. corresponding with the U.S. Pat. Appl. Ser. No. 22,376. Representatives thereof are, e.g.:

8. 7-dimethylamino-1-methyl-3-phenyl-quinolin-2(1H)-one 9. 7-dimethylamino-1-methyl-3-phenyl-quinoline-2(1H)-thione 10. 7-diethylamino-1-methyl-3-phenyl-quinolin-2(1H)-one 11. 7-diethylamino-1-methyl-3-phenyl-quinoline-2(1H)-thione Preferred compounds falling within the scope of Formula IV are styryl dye bases and styryl vinyl dye bases and compounds such as:

12. 2-(4-dimethylaminophenyl)-benzoxazole

Ref. U.S. Pat. 2,793,792 of J. B Pilkington, issued May 28, 1957.

13. 2-(4-dimethylaminophenyl)-naphth-oxazole

Ref. J. Prakt. Chem. [2], 157, p. 219 (1941).

14. oxazolone with H₃C₂N–C₆H₄– and –N–C₆H₅ substituents

Ref. Ber. 89, p. 1748 (1956).

TABLE—Continued

15. [structure with reference] Ref. Ber. 89, p. 1748 (1956).

16. [structure]

17. [structure] Ref. U.S. Pat. 3,189,447 of Wilhelm Mengebauer, Martha Tomanek and Hans Behmenburg, issued June 15, 1965.

Preferred compounds falling within the scope of Formula VI are described in the United Kingdom patent specification 853,880 filed Dec. 16, 1957 by Kalle AG, e.g.:

18. [structure]

Preferred compounds falling within the scope of Formula V are merocyanines, e.g. those described in the United Kingdom patent specification 1,131,238 filed Nov. 16, 1965 by Eastman Kodak Co. Representatives thereof are e.g.:

19. [structure]

20. [structure]

21. [structure]

22. [structure]

23. [structure]

24. [structure]

25. [structure]

(B) organic compounds containing an aromatic nucleus or aromatic ring system in which two adjacent carbon atoms are common to said nucleus or ring system and to an adjacent ring which has no conjugated character and which at one end is linked to the aromatic nucleus or ring system through a carbon-carbon bond and at the other end is linked to said nucleus or ring system through an electron-donating group such as a secondary or tertiary amine group, said organic compounds include those having a said nucleus or ring system in substituted form.

Preferred compounds belonging to Class B are described, e.g. in the Belgian patent specification 727,433 filed Jan. 27, 1969 by Gevaert-Agfa N.V. corresponding with the U.S. Pat. Appl. Ser. No. 793,881. Representatives thereof are, e.g.;

26. [structure]

27. [structure]

wherein:

$n$ is a positive integer of at least 2, and
R represents hydrogen or an alkyl group including a substituted alkyl group.

(C) organic nitrogen containing compounds having a thiol group or in their tautomeric form a thione group as represented in the following tautomeric structural parts:

$$HS-C=N \rightleftarrows S=C-NH$$

Preferably used are heterocyclic compound having the following tautomeric general formulae:

[structures]

wherein:

X represents oxygen, sulphur, selenium or the group $$-\overset{|}{N}R$$

in which R is hydrogen or an organic group e.g. an alkyl group including a substituted alkyl group, preferably a $C_1$-$C_5$-alkyl group, and Z represents the necessary atoms to close a 5- or 6-membered heterocyclic nitrogen containing ring or ring system including such ring or ring system in substituted form e.g. benzthiazole, benzselenazole, benzoxazole, or benzimidazole ring.

Preferred compounds falling within the scope of Class C are, e.g.:

28. [structure]

29. [structure]

30. [structure]

31. [structure]

32. [structure]

33. [structure]

34. [structure]

imidazolidine-4-on-2-thiones, e.g.:

35. [structure]

tetrahydro pyrimidine-2-thiones, e.g.:

36. [structure]

tetrahydro- and dihydro-oxazine-2-thiones and thiazine-2-thiones, e.g.:

37. [structure]

38. [structure]

1,3,4-dihydro thiadiazine-2-thiones, e.g.:

39. [structure]

thiourea compounds including substituted derivatives preferably N-phenyl thiourea compounds, e.g.:

40. [structure]

thioamides, e.g.:

41. [structure]

It is remarkable that most of the suitable sensitizing mercapto compounds are generally known black-toning agents in the silver complex diffusion transfer process.

(D) inorganic compounds producing photoelectrons under the influence of activating electromagnetic radiation and having a basic or amphoteric character, e.g. photoconductive zinc oxide and PbO.

In case photoconductive zinc oxide is used as sensitizing substance the recording layer contains preferably from 5 to 50 parts by weight of zinc oxide dispersed in 100 parts by weight of binding agent containing the spiropyran compound(s) preferably in an amount of 1 to 50 parts by weight and the photosensitive reactant for forming the dyestuff salt, e.g. a photosensitive organic halogen compound such as carbon tetrabromide and/or iodoform in an amount of 10 to 250 parts by weight.

As a further constituent the photosensitive recording layer according to the present invention may contain a film-forming binder that has no sensitizing properties. For that purpose preferably hydrophobic polymers are used that shield as much as possible the ingredients from a direct contact with the atmosphere and more especially from oxygen.

Particularly suitable binders for use in the present invention are hydrophobic polymers and copolymers e.g. containing styrene, vinyl acetate, acrylonitrile, acrylic acid ester, methacrylic acid ester or butadiene units, hydrophobic cellulose derivatives, phenoxy resins or polycondensates of the polyester type, e.g. polycarbonates.

These polymers can be used in a mixture for improvement of the mechanical strength or adhering power of the recording layer to its support when no self-supporting layer is produced.

In order to diminish the rate of spontaneous thermal color formation over long periods of time as might be encountered during storage of the photographic material and processing of the photographic materials so-called antifoggants may be added to the photosensitive composition. Suitable antifoggants include triaryl compounds of group V elements, e.g. triphenylstibine and sterically hindered phenols, e.g. 2,6-di-tert.butyl p-cresol and other reducing or atmospheric oxygen accepting agents. Triphenylstibine and analogous compounds for the purpose of the present invention are described in the United Kingdom patent specification 1,071,104 filed Aug. 14, 1964 by Horizons Inc.

A dry photographic coating containing the above mentioned ingredients may be formed by dissolving the binding agent(s) in a suitable inert solvent which acts as dispersing or dissolving medium for the other ingredients and which is removed from the coating composition by evaporation leaving a solid photographic recording layer on a properly chosen support. The supports may be of any kind encountered in silver halide photographic materials, e.g. paper and film supports.

In order to realize the highest sensitivity, it is desirable to coat the recording layers in the absence of oxygen or to keep them before the exposure in an oxygen-free environment.

The photosensitive organic polyhalogen compounds that in exposed state form with a spiropyran compound a dyestuff salt are normally only sensitive in a wavelength range between 400 and 250 nm.

Various sensitizing agents of the enumerated classes sensitize the recording composition in its inherent sensitivity range and it is assumed that they may also be considered as chemical sensitizing agents for they may chemically interact with photoradicals formed during the exposure.

A choice of a proper combination of sensitizing agents that are active for extending the sensitivity in the visible spectrum of the print-out recording composition used in the present invention makes it possible to apply white or colored light in the information-wise exposure.

By using organic spectral sensitizing agents, e.g. that are within the scope of the definition of Class A and that have in their structure a conjugated system of sufficient length it is possible to extend the spectral sensitivity into the visible light spectrum and even into the infrared.

The polymeric compounds applied in the present invention as sensitizing agent for the photochemical formation of the dyestuff salts may itself in a known way be sensitized spectrally by dyes useful for that purpose. So when using poly-N-vinylcarbazole and/or photoconductive zinc oxide it may be treated with the different types of spectral sensitizing agents known for it from their application in electrophotography. Preferred spectral sensitizing dyes for the photosensitive composition used in the present invention belong to the class of the internally ionized dyes, e.g. merocyanines and the styryl and styryl vinyl dye bases as described, e.g. in Photographic Chemistry vol. II by P. Glafkidès, Fountain Press—London (1960) pp. 844–845 and in the French patent specification 1,574,740 filed Mar. 11, 1968 by Bell & Howell.

The spectral sensitization over the whole visible spectrum opens the possibility to produce print-out multicolor prints by means of one and same recording material. So, on using a recording material containing superposed recording layers sensitized respectively in the red, green, and blue region of the spectrum and containing the proper dye forming combination superposed cyan, magenta and yellow part images can be produced that offer a full reproduction of the multicolor original used in the information-wise exposure.

The recording materials sensitized according to the present invention are suited to produce print-out images of different color according to the type of spiropyran compound applied.

The stabilization of the obtained prints may proceed by washing out the residual free radical generator with a suitable solvent or solvent mixture, e.g. a hydrocarbon liquid such as petroleum ether optionally mixed with acetone or by simply evaporating it by raising the temperature when the compound involved is sufficiently volatile. For the latter purpose and the high photosensitivity, carbon tetrabromide or a mixture of carbon tetrabromide and iodoform is preferred.

According to a preferred recording and reproduction process of the present invention the information-wise exposure is carried out in such a way that first a latent image is produced which is transformed into a visible dye image by means of a so-called "optical development."

The optical development proceeds by uniformly exposing the entirety of the surface of the recording layer containing the latent or barely visible image to visible radiation which is within the spectral absorption band of the products formed by the image-wise exposure and image-wise interaction of the photoexposed ingredients (1) and (2) of the mentioned photosensitive composition. In the overall exposure no exposing light is employed to which the photosensitive polyhalogen compound is inherently sensitive since thereby the effect of the image-wise exposure is masked by an overall coloration. It is advantageous to use in the optical development exposure a cut-off filter absorbing all the light corresponding with the wavelength range that is inherently absorbed by the ingredients of the nonpreviously exposed recording layer.

The optical development effect is markedly speeded up and the image density increased by applying heat e.g. supplied by contact with a hot body or through infrared radiation during the overall exposure to visible light.

The increase of speed of the optical development is very outspoken by the use of poly-N-vinyl carbazole and the copolymers containing N-vinyl carbazole units.

The optical development speed obtains a particularly high value by the use of poly-N-vinyl carbazole or the copolymers containing N-vinyl carbazole units in combination with the mercapto compounds of class (C). The addition of a triarylstibine such as triphenylstibine to that combination intensifies the image density obtained by the optical development procedure.

It is assumed that during the exposure applied in the optical development at least a part of the overall applied light energy is visible light, absorbed by a dyestuff salt having the pyrylium structure when using a diarylo spiropyran or having an indolinium salt structure when using an indolino-arylospiropyran. Said salt seems to act as a spectral sensitizing agent for a chemical reaction between the photosensitive polyhalogen compound producing the necessary radicals for forming the dyestuff salt with the spiropyran.

In a particular preferred composition for forming print out as well as optical developable prints a mixture of $CBr_4$ and $CHJ_3$ yielding a superadditive sensitivity effect is used.

Preferred recording layer compositions contain a spiropyran compound or mixture of spiropyran compounds and poly-N-vinylcarbazole in a ratio by weight within the range of 80:100 to 10:100 and a photosensitive polyhalogen compound such as carbon tetrabromide or iodoform or a mixture of both said polyhalogen compounds with respect to poly-N-vinyl carbazole in a ratio by weight in the range of 160:100 to 20:100.

Said recording layer compositions comprise preferably an antifogging agent, e.g. triphenyl stibine.

Preferred amounts of antifogging agent such as triphenyl stibine are with respect to photosensitive carbon tetrabromide and/or iodoform within the weight ratio range of 1:100 to 2.5:100.

According to an alternative embodiment of the optical development technique the recording material is first overall exposed to electromagnetic radiation to produce nondifferentially over the whole recording layer latent dyestuff centres that are afterwards optically developed informationwise by a sufficiently strong information-wise exposure in the absorption band of the dyestuff centers. Optionally the information-wise exposure proceeds simultaneously with an overall heating, e.g. effected by an overall infrared light exposure.

Instead of applying an overall pre-exposure to form the dyestuff centres these dyestuffs may be added, e.g. applied by imbibition (diffusion) in minor amounts to the recording layer composition to act as optical development nuclei for the dye image formation by image-wise exposure.

According to a special embodiment the spiropyrans are formed in the nonexposed recording layer composition "in situ" by starting from the corresponding pyrylium and indolinium salts and adapting the pH in a proper way to obtain the spiropyrans that may be considered as the dyestuff precursors of the pyrylium and indolinium salts, respectively.

The information-wise exposure applied in the present invention may be a contact exposure of the direct or reflex type and also an optical projection exposure as used, e.g. in an optical enlarging apparatus. The information-wise exposure need not be simultaneous in all parts of the recording material. The exposure may be progressive in one continuous step as, e.g. in sound track recording or in successive intermittent steps provided that the required information-wise change is obtained. Thus the recording material may be scanned with an image-wise modulated radiant energy spot of high intensity, e.g. a laser beam, or the material may be progressively exposed through a slit, e.g. is exposed to copying light of a tubular lamp that is given a translation movement along the original.

A recording material of the present invention being suited for the recording of information in the form of modulated ultraviolet radiation can be used in X-ray and electron-beam recording. X-ray beams can be absorbed in high energy absorbing substances and create by means of them so-called secondary photons, e.g. of the ultraviolet radiation energy band and photoelectrons that are absorbed by the photosensitive polyhalogen compound forming through its photoradicals a dyestuff salt with the spiropyran. Substances for high energy absorption that may be incorporated in the recording element contain the elements lead, mercury, bismuth, barium and/or tungsten. Lead compounds that themselves are photosensitive are preferred, e.g. lead monoxide, lead bromide and lead iodide.

Suitable light sources for use in a recording method of the present invention are ultraviolet light sources, xenon-gas lamps, incandescent bulbs, the light of the sun and flash lamps. In the overall exposure for the optical development an infrared lamp emitting also in the visible spectrum is preferably used.

Electron beam and laser beam recording proceed with the apparatus suited for that purpose and known to those skilled in the art.

Recording materials of the present invention are very versatile in that they by the use of a proper sensitizing agent can be applied for continuous tone or halftone reproduction. They can offer very contrasty images so that they are very suited for the reproduction of line and screen type originals and find a successful use in a great variety of graphic art applications. Due to the very high resolving power of the recording materials (the dyestuffs are formed in molecularly divided form) the recording materials of the present invention are particularly suited for microfilm reproduction and high precision image rendering as, e.g. in the production of optical micromask masters used in the manufacturing of microelectronic circuitry.

In the preparation of optical micromask masters preferably a photosensitive layer is applied to glass because it constitutes a very dimensionally stable support. Herein, however, the problem arises of the adherence of the photosensitive layer to such a support. For a good adherence of organic layers to glass some organic silicon compounds are known such as the epoxysilanes described in the United States patent specification 2,946,701 and the published Dutch patent application 6917318. For making organic polymers containing reactive hydrogen atoms adhere to glass preferably the epoxy-silanes are used.

A polymer possessing sensitizing properties and fulfilling the role of binding agent having adhesive powder with respect to glass preferably is a copolymer of the monomer N-vinylcarbazole and a monomer containing reactive hydrogen as is present in hydroxyl and amino groups. A very suitable polymer of this type is co(N-vinylcarbazole/methyl acrylate/2-hydroxyethyl acrylate) (60/30/10 parts by weight). An example of a specially suitable epoxysilane to be used in combination with the copolymer mentioned above is the compound having the formula:

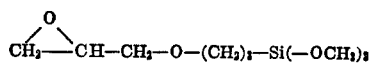

In order to confer to the photosensitive layer containing said combination a special mechanical strength, preferably an organic diisocyanate is added thereto as a crosslinker. A suitable organic diisocyanate is e.g. hexamethylene disocyanate.

As wetting agent for applying said photosensitive layers to glass a successful use can be made of silicone oil.

The reflex-exposure properties of the present recording materials make them very useful in the document reproduction sector since they offer in a reflex-contact exposure print-out images of a sufficiently intense spectral density.

According to a special application a recording layer as described herein is used in conjunction with a magnetic recording layer and is more particularly applied at the rear side of a flexible tape support carrying the magnetic recording layer. Using such a material a sound track is formed in the magnetic recording layer and a visual text image corresponding with the sound track photographed on the recording layer of the present invention.

Such a recording material thus allows the storing of optical and acoustic signals and makes it possible to reproduce both informations simultaneously.

The present invention is illustrated by the following examples without, however, limiting it thereto.

EXAMPLE 1

Test A

A photosensitive recording layer was prepared by coating 500 mg. of carbon tetrabromide, 25 mg. of di-$\beta$-naphthospiropyran dissolved in 8 ml. of a 5% solution of poly-N-vinyl carbazole in methylene chloride at a thickness of 0.1 mm. onto an unsubbed polyethylene terephthalate support.

After drying in the dark the recording layer was exposed for 2 min. through a grey wedge (constant 0.15) with a 80 w. high pressure mercury vapor lamp type HPL sold by N.V. Phillips' Gloeilampenfabrieken—Eindhoven (The Netherlands) placed at a distance of 10 cm. The exposure resulted in the print-out reproduction of 15 steps.

The same recording material was used for optical development proceeding as follows.
(1) the recording layer was first image-wise exposed under the same conditions as described for the print-out exposure, the image-wise exposure lasting, however, only 3 sec. and resulting in a latent image;
(2) subsequently the latent image was optically developed to a cyan visible image having a maximum density 1.5 by means of an overall exposure lasting 10 sec. and carried out with a 250 w. infrared lamp emitting also in the visible spectrum (the lamp is sold by Bie and Berntsen, 35 Pilestraede, Copenhagen, Denmark). During the overall exposure a cut-off filter (Corning C.S. 3–67) is used absorbing all the light having a wavelength smaller than 540 nm.

Test B

The print-out exposure was repeated with a same material as described in Test A with the difference, however, that the poly-N-vinyl carbazole was replaced by a same amount of polystyrene as binder.

The same print-out exposure resulted in the reproduction of only 3 steps.

In order to obtain the same optical development density as described in Test A, the image-wise exposure lasted 60 sec. and the overall exposure had to proceed for 4 min.

EXAMPLE 2

Tests A and B of Example 1 were repeated with the same compositions except for the fact that the 500 mg. of carbon tetrabromide were replaced by a mixture of 200 mg. of iodoform and 200 mg. of carbon tetrabromide.

The print exposure of the poly-N-vinylcarbazole containing layer yielded 17 steps whereas the layer containing polystyrene could only reproduce 5 steps.

Optical development processing

The recording material containing polystyrene as sole binder was at a distance of 10 cm. for 3 sec. exposed through a negative line image transparency with a HPL lamp—80 w. (trade name). Thereupon the image-wise exposed film was subjected to an overall exposure by means of an infrared lamp of 250 w. (sold by Bie and Berntsen, 35 Pilestraede, Copenhagen, Denmark) emitting also in the visible part of the spectrum. Between the infrared lamp and the recording layer a cut-off filter was placed absorbing all the light with a wavelength smaller than 540 nm. (Corning C.S. 3-67).

Within an overall exposure period of 4 min. a cyan image having opposite image values with respect to the original and having an optical density (D) of about 1 was obtained. The obtained image was stabilized by heating at 120° C. for 10 min.

The recording material containing poly-N-vinyl carbazole as sole binder was for obtaining the same optical development result exposed for only 1 sec. in the image-wise exposure and for 2 sec. in the overall exposure.

EXAMPLE 3

The same photosensitive poly - N - vinylcarbazole containing composition as applied in Example 2 was prepared but also 50 mg. of 2,6-di-tert·butyl-p-cresol as antifogging agent were added thereto.

After coating and drying the recording layer composition and subjecting it to a print-out exposure carried out as described in Example 1 a print-out image containing 13 visible steps was obtained.

An image-wise exposure of less than 1 sec. was sufficient to produce an optical dense cyan image in an optical development overall exposure lasting 20 to 30 sec. and being carried out with the means described in Example 1. The image showed only a very faint background coloration.

EXAMPLE 4

Example 3 was repeated but instead of 50 mg. of 2,6-ditert.butyl-p-cresol 15 mg. of triphenylstibine were added as antifogging agent or stabilizer. An almost black image on a clean background was obtained.

EXAMPLE 5

A photosensitive composition consisting of 200 mg. of carbon tetrabromide, 200 mg. of iodoform, 40 mg. of di-β-naphthospiropyran, 20 mg. of triphenylstibine, 10 mg. of 2-mercaptobenzthiazole and 8 ml. of a 5% by weight solution of poly-N-vinylcarbazole in methylene chloride was coated at a thickness of 0.12 mm. onto a non-subbed polyethylene terephthalate support. The coated layer was dried for 30 min. at 50° C.

The obtained photosensitive recording layer was contact-exposed through a transparent line original. The exposure lasted 0.3 sec. and was carried out with a 80 w. high pressure mercury vapor bulb, type HPL (trade name) placed at a distance of 7 cm. with respect to the recording layer. A latent (nonvisible) image was obtained.

This latent image was developed optically by means of an overall exposure through a cut-off filter absorbing all the light having a wavelength smaller than 540 nm. and using a 250 w. infrared lamp placed at a distance of 15 cm. On effecting that overall exposure whilst keeping the recording material in thermal contact with a hot plate (60 °C.) the optical development proceeded within less than 2 sec. reaching an image density of more than 2.5 (measured in transmission).

The fixation of the obtained visible image proceeded by heating the recording material at 175° C. for 10 sec. under strong air circulation.

In the absence of 2-mercapto-benzthiazole or without applying heat during the optical development the formation of the visible image was markedly slower.

EXAMPLE 6

A photosensitive composition as described in Example 5 but containing in addition 0.003 g. of a merocyanine dye having the following structure:

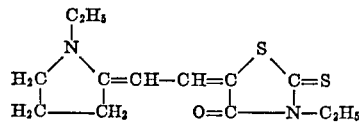

was used to produce a photosensitive recording layer of the same thickness as described in Example 5.

The image-wise exposure proceeded for 1 sec. through a transparent line original in a 3M Photocopier 179 (trade name) operating with a white light exposure source (setting ½). A latent image was formed which was made visible by the same optical development procedure as described in Example 5.

EXAMPLE 7

A photosensitive composition consisting of 0.12 g. of carbon tetrabromide, 0.12 g. of iodoform, 0.15 g. of 3-methyldi-β-naphthospiropyran, 0.02 g. of triphenylstibine, 0.015 g. of 2-mercaptobenzthiazole and 10 ml. of a 5% solution of poly-N-vinylcarbazole in a mixture of methylene chloride and 1,1,2-trichloroethane (1:1 by volume) was coated at a thickness of 0.12 mm. onto a nonsubbed polyethylene terephthalate support. The coating was dried for 1 hr. at 50° C. The obtained recording material was contact-exposed for 5 min. through a grey wedge (constant: 0.15) using a Chemcut-exposure apparatus model D–7, Double Sided Photoprinter containing 9 ultraviolet fluorescent lamps of each 20 w. covering an exposure area of 60 x 60 cm.

The exposed film strip was divided up longitudinally into two parts. Of one of them immediately the maximum spectral density of the wedge step prints was measured by transmission under small intensity red light conditions. The other part was stabilized thermally by heating it for 15 sec. at 180° (strong ventilation). Subsequently the spectral density of the wedge print steps was measured by transmission. The comparison of the obtained spectral density results gives an idea of the image density increase during the thermal stabilization.

The results of these measurements is listed in the following table.

TABLE 8

| Number of the step | Spectral density after— | |
|---|---|---|
| | Exposure and before thermal stabilization | Exposure and thermal stabilization |
| 1 | 0.72 | 2.60 |
| 2 | 0.60 | 2.55 |
| 3 | 0.50 | 2.27 |
| 4 | 0.38 | 2.20 |
| 5 | 0.33 | 2.05 |
| 6 | 0.27 | 1.73 |
| 7 | 0.20 | 1.20 |
| 8 | 0.16 | 0.67 |
| 9 | 0.14 | 0.40 |
| 10 | 0.10 | 0.20 |
| 11 | | 0.12 |
| 12 | | 0.08 |

EXAMPLE 8

A photosensitive composition consisting of 0.12 g. of acrbon tetrabromide, 0.12 g. of iodoform, 0.15 g. of 3-methyl-di-β-naphthospiropyran, 0.04 g. of triphenylstibine, 0.01 g. of 2-mercaptobenzthiazole and 10 ml. of a 5% poly-N-vinyl carbazole solution in a mixture of methylene chloride and 1,1,2-trichloroethane (1:1 by volume) was coated at a thickness of 0.12 mm. onto a nonsubbed polyethylene terephthalate support. The coating is dried for 1 hr. at 60° C.

The obtained photosensitive film was reflectographically exposed in contact with an opaque original being a black printed text on a white paper. The exposure was carried out in the 3M Photocopier 179 (trade name) operating at full intensity for an exposure time of 4 sec.

Subsequently the recording material was optically developed by overall exposing it for 3 to 5 sec. with an infrared lamp of 250 w. (sold by Bie and Berntsen, 35 Pilestraede, Copenhagen, Denmark) placed at 15 cm. and emitting also in the visible part of the spectrum.

Between the infrared lamp and the recording layer a cut-off filter was placed absorbing all the light with a wavelength smaller than 540 nm. (Corning C.S. 3–67).

A very sharply defined blue-black negative image of the original was obtained having in the image parts of maximum optical density of 2.5 and in the image-background parts an optical density of less than 0.01.

The image was stabilized by a 15 sec. heat treatment at 180° C. in a ventilated drying box.

EXAMPLE 9

A photosensitive layer composition was prepared by mixing the following ingredients:

100 mg. of carbon tetrabromide,
100 mg. of iodoform
70 mg. of 3-methyl-di-β-naphthospiropyran
10 mg. of triphenylstibine and 10 ml. of a 4% solution in a mixture of methylene chloride and 1,1,2-trichloroethane (50:50 by volume) of a copolymer of N-vinylcarbazole and ethylacrylate (75:25 by weight).

This solution was applied to a flat glass plate at such a covering rate that the dried layer obtained a thickness of 10 microns.

The dried layer was exposed through a high resolution silver image optical master mask used in the manufacture of "integrated circuits." The exposure was carried out for 2 min. with a 80 w. high pressure mercury vapor tube type HPL (trade name) placed at a distance of 10 cm.

The recording material was stabilized against further exposure by keeping it for 5 min. at 150° C. in a ventilated drying box.

The recording material containing a high resolution cyan print-out image proved to have a high durability and was suited for repeated use as optical mask in the exposure of a light-sensitive photoresist layer applied on a silicon slice.

EXAMPLE 10

A photosensitive layer composition was prepared by mixing the following ingredients:

100 mg. of carbon tetrabromide,
100 mg. of iodoform,
70 mg. of 1,1,3-trimethylindolinobenzopyrylospiran,
2 mg. of trimethoxyglycidyloxypropylsilane (surfactant for a glass plate) and 10 ml. of a 4% solution of methylene chloride and 1,1,2-trichloroethane (50:50 by volume) of a copolymer of N-vinylcarbazole and methyleneacrylate (60:40 by weight).

The coating and exposure was the same as described in Example 9 but resulted in a yellow mask image absorbing blue light and ultraviolet-light in the image portions.

Same results were obtained by applying the following N-vinylcarbazole copolymers:

copoly(ethylacrylate/N-vinylcarbazole) in a 30/70, 40/60 or 50/50 ratio by weight
copoly(methylacrylate/N - vinylcarbazole) in a 20/80, 30/70, 40/60 or 50/50 ratio by weight
copoly(butylacrylate-N-vinylcarbazole) in a 25/75 ratio by weight.

The following colors were obtained with other spiropyran compounds:

| Number of the spiropyran compound | Color of the image |
|---|---|
| 31 | red. |
| 32 | yellow. |
| 34 | blue. |
| 35 | blue. |
| 36 | yellow. |
| 38 | dark blue. |
| 39 | dark blue. |

EXAMPLE 11

A photosensitive composition consisting of 100 mg. of carbon tetrabromide, 100 mg. of iodoform, 120 mg. of 3-methyl-di-β-naphthospiropyran, 10 mg. of 2-mercaptobenzthiazole, 20 mg. of triphenylstibine and 10 ml. of a 5% solution of poly-N-vinylcarbazole in a mixture of methylene chloride/1,1,2-trichloroethane (1:1 volume ratio) was coated at a thickness of 0.1 mm. onto a polyethylene terephthalate film strip provided with a conductive subbing layer of Calgon Conductive Polymer 261 (registered trademark) of Calgon Corporation, Inc., Pittsburgh, Pa., U.S.A. for a solution containing 39.1% by weight of a conductive polymer having recurring units of the following type:

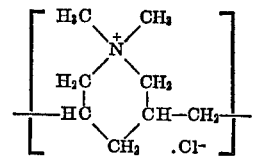

The obtained photosensitive recording layer was dried at 50° C.

The electron-beam sensitivity of the photosensitive layer was tested in a vacuum of $10^{-4}$ mm. Hg.

The electron beam recording proceeded with electrons accelerated by a potential difference of 20 kv. The charge density measured at the level of the recording layer was $2.10^{-5}$ coulomb per sq. cm.

The optical density (measured in transmittance) of the area struck by the electron beam was 2. The measurement was preceded by a 10 sec. thermal stabilization of 175° C.

EXAMPLE 12

A photosensitive recording layer was prepared by coating 500 mg. of carbon tetrabromide, 20 mg. of di-β-naphthospiropyran and 5 mg. of poly-N-vinylcarbazole in 10 ml. of a 5% solution of polystyrene in methylene chloride at a thickness of 0.1 mm. onto an unsubbed polyethylene terephthalate support.

The coated layer was dried at 50° C.

The recording layer was exposed for 2 min. through a grey wedge (constant 0.15) with a 80 W–HPL (trade name) ultraviolet lamp placed at a distance of 10 cm. The exposure resulted in a print-out wedge image containing 8 visible steps.

The image stabilization was effected by heating at 150° C.

The same recording layer was used for optical development proceeding as follows:

(1) The recording layer was first image-wise exposed for 3 sec. in contact with a transparent line original. In the image-wise exposure the same ultraviolet lamp and exposure distance was used as in the print-out exposure.

The obtained latent image was optically developed by means of an overall exposure lasting 40 sec. using an infrared lamp of 250 w. associated with a cut-off filter absorbing all the light having a wavelength smaller than 580 nm. (Corning CS 3–13). A negative cyan image was obtained that was stabilized by heating the recording layer at 150° C.

EXAMPLE 13

A photosensitive layer was prepared by coating 250 mg. of α,α,α-tribromoacetophenone, 100 mg. of 3-methyl-di-β-naphthospiropyran and 2 mg. of triphenylstibine in 10 ml. of a 5% solution of poly-N-vinylcarbazole in a mixture of methylene chloride/1,1,2-trichloroethane (1:1 by volume) at a thickness of 0.1 mm. to an unsubbed polyethylene terephthalate support.

The coated layer was dried at 50° C.

The dried recording layer was exposed for 20 sec. in contact with a grey wedge print original (constant 0.15) in an Actina SH (trade name) diazo copying apparatus containing a 1000 w. ultraviolet lamp. The obtained print-out image contained 11 visible steps.

The stabilization was carried out by rinsing the recording layer for 20 sec. in ethyl acetate.

The same recording material was used for optical development. It was first image-wise contact exposed for 5 sec. through a transparent line original with a 80 w. HPL lamp (trade name) placed at distance of 10 cm. The obtained latent image was optically developed by an overall exposure lasting 5 sec. using a 250 w. infrared lamp associated with a cut-off filter Corning CS 3–67 absorbing all the light with a wavelength smaller than 540 nm. A cyan image having reversed image values with respect of the original was obtained.

The percentages and ratios mentioned in the examples are by weight unless otherwise indicated.

We claim:

1. A photographic process for forming a visible image in a recording material which comprises in intimate admixture:
   (1) at least one spiropyran compound of the group consisting of a spirodibenzopyran, a spirodinaphthopyran, a spirobenzonaphthopyran, a 1,3,3-trimethylindolino-benzospiropyran, a 1,3,3-trimethylindolino-naphthospiropyran, or a spiropyran that contains a condensed anthracene or phenanthrene nucleus;
   (2) at least one ultra-violet light-sensitive organic polyhalogen compound capable of producing on exposure with ultraviolet light a dye salt with the spiropyran compound and having the general formula:

wherein:
   each of A, B, X and Y is a chlorine, bromine or iodine atom; or one of said radicals A, B, X or Y is an alkyl group, an aryl group, or an aroyl group and the other radicals are each chlorine, bromine or iodine; or two of said radicals A, B, X or Y each is an aromatic acyl group and the other radicals are each chlorine, bromine or iodine; and (3) in working relationship with said mixture a polymeric compound containing recurring units of the general structure:

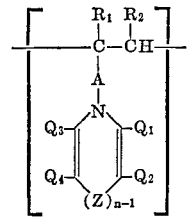

wherein:
   Z is a sulphur atom or a single bond,
   A is a single bond or a divalent hydrocarbon group,
   $R_1$ is hydrogen or a lower alkyl group,
   $R_2$ is hydrogen or a lower alkyl group,
   $Q_1$ and $Q_2$ each represent a hydrogen atom or together the necessary atoms to close an adjacent carbocyclic ring,
   $Q_4$ and $Q_3$ each represent a hydrogen atom or together the necessary atoms to close an adjacent carbocyclic ring,
   $n$ is 1 or 2, said process comprising the steps of exposing said recording material to activating electromagnetic radiation of an intensity sufficient to produce a visible image directly or a latent image that can be rendered visible by optical development.

2. The process of claim 1 wherein said exposure produces a latent image and said latent image is optically developed and comprising the steps of: imagewise exposing the recording material to activating electromagnetic radiation of an intensity sufficient to bring about a latent or barely visible image having an increased spectral sensitivity in a wavelength range outside the inherent sensitivity range of the ultraviolet light-sensitive compound, and then uniformly exposing the entire imagewise exposed recording material to light within the wavelength range for which the initially exposed portions are of increased sensitivity than the initially non-exposed portions, thereby increasing the visibility of said initially formed image.

3. The process of claim 1 wherein said exposure produces a latent image and said latent image is optically developed and comprising the steps of: uniformly exposing the entire recording material to electromagnetic radiation of an intensity sufficient to bring about in the recording material an increase in its spectral sensitivity in a wavelength range outside the inherent sensitivity range of the ultraviolet light-sensitive compound, and then imagewise exposing the overall exposed recording material within the wavelength range for which the overall exposed recording material is of increased sensitivity to increase the visibility of the initially formed image.

4. A photographic process according to claim 1 wherein the recording material after the formation of a visible image is overall heated to bring about image stabilization.

5. A photographic process according to claim 1 wherein said spiropyran compound corresponds to one of the following general formulae:

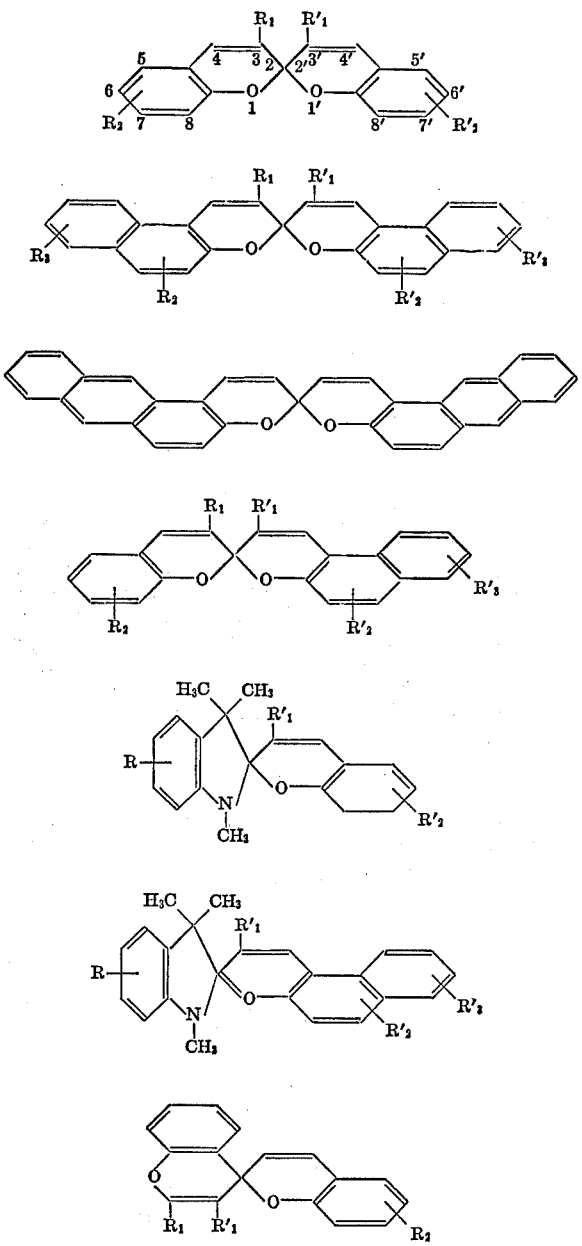

wherein:
R, $R_1$, $R'_1$, $R_2$, $R'_2$, $R_3$ and $R'_3$ each represent hydrogen, alkyl, alkyl substituted with halogen, alkyl substituted with an ester group, alkyl substituted with a carboxyl group, alkyl substituted with a N-phenylcarbamyl group, a hydroxy group, an alkoxy group, an aryloxy group, a phenyl group, piperidyl, acetyl, halogen, nitro, or $R_1$ and $R'_1$ together represent a $-(CH_2)_n-$ chain wherein $n=2$ or 3 to link the carbon atoms in the 3 and 3' positions together.

6. A process according to claim 1 wherein said ultraviolet light-sensitive compound is carbon tetrabromide or iodoform.

7. A process according to claim 1 wherein said ultraviolet light-sensitive compound is a mixture of carbon tetrabromide and niodoform is used.

8. A process according to claim 1 wherein said recording material contains as an anti-fogging agent a triaryl compound of a group V element or a sterically hindered phenol.

9. A process according to claim 1 wherein the mixture is present in a layer of at least one polymeric binding agent of the group of styrene, vinyl acetate, acrylonitrile, acrylic acid ester, methacrylic acid ester, N-vinylcarbazole or butadiene units, a hydrophobic cellulose derivative, a phenoxy resin or polyester polycondensate.

10. A process according to claim 1 wherein the exposure is a direct exposure.

11. A process according to claim 1 wherein the exposure is a reflex exposure.

12. A process according to claim 1 wherein the exposure is an electron beam exposure.

13. A photosensitive recording material for the direct production of a visible image by imagewise exposure to activating electromagnetic radiation which comprises a layer of an intimate mixture consisting essentially of:
(1) at least one spiropyran compound of the group consisting of a spirodibenzopyran, a spirodinaphthopyran, a spirobenzonaphthopyran, a 1,3,3-trimethylindolino-benzospiropyran, a 1,3,3 - trimethylindolino-naphthospiropyran, or a spiropyran that contains a condensed anthracene or phenanthrene nucleus;
(2) at least one ultraviolet light-sensitive organic polyhalogen compound capable of producing on exposure with ultraviolet light a dye salt with the spiropyran compound and having the general formula:

wherein:
each of A, B, X and Y is a chlorine, bromine or iodine atom; or one of said radicals A, B, X or Y is an alkyl group, an aryl group, or an aroyl group and the other radicals are each chlorine, bromine or iodine; or two of said radicals A, B, X or Y each is an aromatic acyl group and the other radicals are each chlorine, bromine or iodine; and
(3) in working relationship with said mixture a polymeric compound containing recurring units of the general structure:

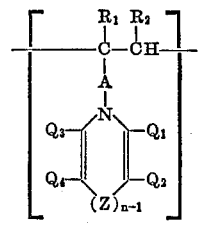

wherein:

Z is a sulphur atom or a single bond,
A is a single bond or a divalent hydrocarbon group,
$R_1$ is hydrogen or a lower alkyl group,
$R_2$ is hydrogen or a lower alkyl group,
$Q_1$ and $Q_3$ each represent a hydrogen atom or together the necessary atoms to close an adjacent carbocyclic ring,
$Q_4$ and $Q_3$ each represent a hydrogen atom or together the necessary atoms to close an adjacent carbocyclic ring,
$n$ is 1 or 2.

14. A photographic material according to claim 13 wherein said spiropyran compound corresponds to one of the following general formulae:

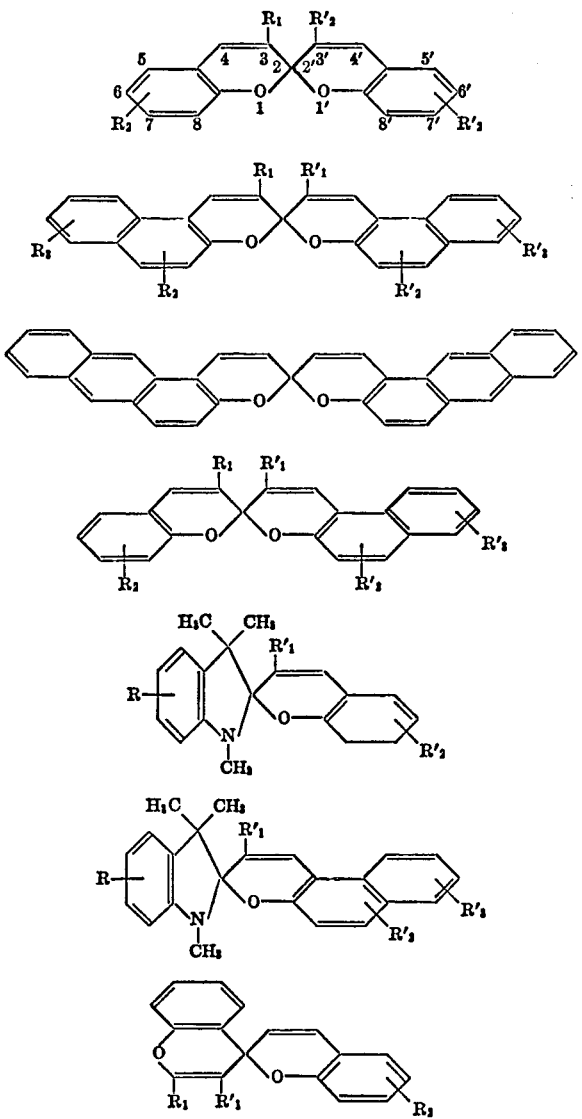

wherein:
R, $R_1$, $R'_1$, $R_2$, $R'_2$, $R_3$ and $R'_3$ each represent hydrogen, alkyl, alkyl substituted with halogen, alkyl substituted with an ester group, alkyl substituted with a carboxyl group, alkyl substituted with a N-phenyl-carbamyl group, a hydroxy group, an alkoxy group, an aryloxy group, a phenyl group, piperidyl, acetyl, halogen, nitro, or $R_1$ and $R'_1$ together represent a $-(CH_2)_n-$ chain wherein $n=2$ or 3 to link the carbon atoms in the 3 and 3' positions together.

15. A material according to claim 13 wherein said ultraviolet light-sensitive compound is carbon tetrabromide or iodoform.

16. A material according to claim 13 wherein said ultraviolet light-sensitive compound is a mixture of carbon tetrabromide and iodoform is used.

17. A photosensitive recording material according to claim 13, containing as an antifogging agent a triaryl compound of a group V element and a sterically hindered phenol.

18. A photosensitive recording material according to claim 13, wherein the recording material contains said spiropyran compound in admixture with said photosensitive organic polyhalogen compound in a ratio by weight of 1:1-50.

19. A photosensitive recording material according to claim 13 wherein the recording material contains said spiropyran compound and poly-N-vinylcarbazole in a ratio by weight within the range of 80:100 to 10:100.

20. A photosensitive recording material according to claim 19 wherein the recording material contains photosensitive carbon tetrabromide or iodoform or a mixture thereof in a ratio with respect to said poly-N-vinylcarbazole in the range of 160:100 to 20:100 by weight.

21. A photosensitive recording material according to claim 20 wherein the recording material contains triphenyl stibine with respect to said photosensitive polyhalogen compound in a ratio by weight in the range of 1:100 to 2.5:100.

22. A photosensitive recording material according to claim 13 wherein said polymeric compound constitutes the sole binding agent of said layer.

23. A process according to claim 1 wherein said mixture is used in association with at least one sensitizing compound of the following classes:

(A) an organic compound containing two radicals of different electron-affinity linked to each other through a conjugated system, and having one of the following general Formulae I, II, III, IV, V or VI:

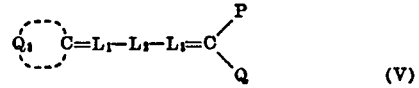

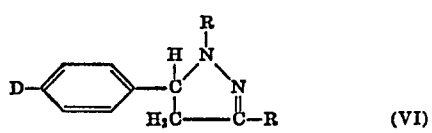

wherein:
D represents an electron-donating group selected from an amino group substituted with alkyl, cycloalkyl or aralkyl, a hydroxy group or a hydroxy group substituted with alkyl, cycloalkyl or aralkyl, Z represents a polymethine chain, an azamethine chain, phenylene or naphthalene, R represents hydrogen, an alkyl group, an aryl group or the necessary atoms to form a homocyclic or heterocyclic ring with an atom of the group Z, $Q_1$ represents the nonmetal atoms necessary to complete a ring or ring system in which the group C=X is linked through a conjugated system of methine groups or of a chain of methine groups bound to nitrogen to a group D, X represents an electronegative atom or group being selected from the group consisting of oxygen, =N-R wherein R is hydrogen or an aromatic group, sulphur, selenium, or

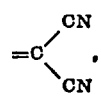

$Q_2$ represents the necessary atoms to form with the carbon atom of the group

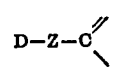

a heterocyclic ring having an electronegative character with respect to the group D, Y represents an electron-attracting group selected from the group consisting of

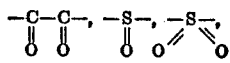

or the group

wherein X has the above meaning,
$Q_3$ represents a heterocyclic nucleus, containing an alkylamino group,
P and Q each represent an electron-attracting cyano group, or P and Q together represent the necessary atoms to close a heterocyclic ring with electronegative character,
each of $L_1$ and $L_3$ represent a methine group, and $L_2$ represents a monovalent chemical bond, a

group or a plurality of such group linked to each other, or $L_1$, $L_2$ and $L_3$ represent together a double bond linking the group

to the group

(B) organic compounds containing an aromatic ring having two adjacent carbon atoms thereof in common with an adjacent ring free of conjugation, said adjacent ring at one end being linked to said aromatic ring through a carbon-carbon bond and at the other end is linked to said ring through an electron-donating group and having one of the following structural formulae:

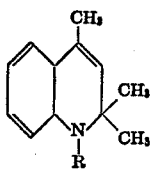

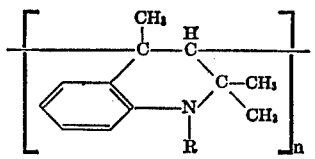

wherein:
n is a positive integer of at least 2, and
R is hydrogen or an alkyl group; and
(C) an inorganic photoconductive metal compound in which said metal is zinc or lead.

24. A material according to claim 13 wherein said mixture is used in association with at least one sensitizing compound of the following classes:
(A) an organic compound containing two radicals of different electron-affinity linked to each other through a conjugated system, and having one of the following general Formulae I, II, III, IV, V or VI:

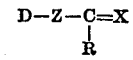   (I)

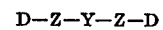   (II)

   (III)

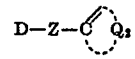   (IV)

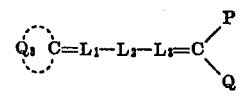   (V)

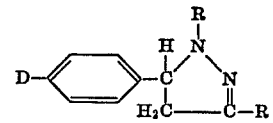   (VI)

wherein:
D represents an electron-donating group selected from an amino group substituted with alkyl, cycloalkyl or aralkyl, a hydroxy group or a hydroxy group substituted with alkyl, cycloalkyl or aralkyl,
Z represents a polymethine chain, an azamethine chain, phenylene or naphthalene,
R represents hydrogen, an alkyl group, an aryl group or the necessary atoms to form a homocyclic or heterocyclic ring with an atom of the group Z,
$Q_1$ represents the nonmetal atoms necessary to complete a ring or ring system in which the group C=X is linked through a conjugated system of methine groups or of a chain of methine groups bound to nitrogen to a group D,
X represents an electronegative atom or group being selected from the group consisting of oxygen, =N—R wherein R is hydrogen or an aromatic group, sulphur, selenium, or

$Q_2$ represents the necessary atoms to form with the carbon atom of the group

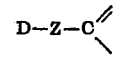

a heterocyclic ring having an electronegative character with respect to the group D,
Y represents an electron-attracting group selected from the group consisting of

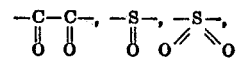

or the group

wherein X has the above meaning,
$Q_3$ represents a heterocyclic nucleus, containing an alkylamino group,
P and Q each represent an electron-attracting cyano group, or P and Q together represent the necessary atoms to close a heterocyclic ring with electronegative character, each of $L_1$ and $L_3$ represent a methine group, and $L_2$ represents a monovalent chemical bond, a

group or a plurality of such group linked to each other, or $L_1$, $L_2$ and $L_3$ represent together a double bond linking the group

to the group

(B) organic compounds containing an aromatic ring having two adjacent carbon atoms thereof in common with an adjacent ring free of conjugation, said adjacent ring at one end being linked to said aromatic ring through a carbon-carbon bond and at the other end is linked to said ring through an electron-donating group and having one of the following structural formulae:

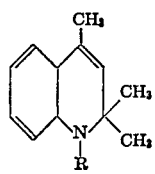

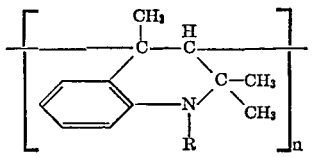

wherein:
$n$ is a positive integer of at least 2, and
R is hydrogen or an alkyl group; and
(C) an inorganic photoconductive metal compound in which said metal is zinc or lead.

References Cited
UNITED STATES PATENTS

| | | | |
|---|---|---|---|
| 3,147,117 | 9/1964 | Wainer et al. | 96—48 |
| 3,667,949 | 6/1972 | Inoue et al. | 96—48 |
| 3,642,479 | 2/1972 | Van Allan et al. | 96—90 PC X |
| 3,486,899 | 12/1969 | Brown | 96—90 PC |
| 3,660,086 | 5/1972 | Tamai et al. | 96—90 PC X |
| 3,359,105 | 12/1967 | Wainer | 96—90 X |
| 3,558,317 | 1/1971 | Petro et al. | 96—90 |
| 3,322,542 | 5/1967 | Ullman et al. | 96—90 PC |
| 3,436,353 | 4/1969 | Dreyer et al. | 96—90 PC X |
| 3,510,300 | 5/1970 | Fotland et al. | 96—90 X |

FOREIGN PATENTS

| | | | |
|---|---|---|---|
| 1,274,655 | 8/1968 | Germany | 96—90 PC |

RONALD H. SMITH, Primary Examiner
W. H. LOUIE, JR., Assistant Examiner

U.S. Cl. X.R.
96—90 PC, 90 R, 48 QP; 250—323